US009855977B2

(12) United States Patent
Chung et al.

(10) Patent No.: US 9,855,977 B2
(45) Date of Patent: Jan. 2, 2018

(54) UNDERBODY STRUCTURE OF VEHICLE (71) Applicants: Hyundai Motor Company, Seoul (KR); Kia Motors Corporation, Seoul (KR)

(72) Inventors: Hee Seouk Chung, Hwaseong-si (KR); Deok Hwa Hong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 15/010,305

(22) Filed: Jan. 29, 2016

(65) Prior Publication Data

US 2017/0101132 A1    Apr. 13, 2017

(30) Foreign Application Priority Data

Oct. 13, 2015   (KR) .......................... 10-2015-0142588

(51) Int. Cl.
*B62D 25/20*   (2006.01)
*B62D 21/02*   (2006.01)
*B62D 21/15*   (2006.01)

(52) U.S. Cl.
CPC ......... *B62D 25/2009* (2013.01); *B62D 21/02* (2013.01); *B62D 21/15* (2013.01); *B62D 25/2036* (2013.01)

(58) Field of Classification Search
CPC ............ B62D 25/2009; B62D 25/2036; B62D 25/2045
USPC .................. 296/183.07, 204, 187.08, 193.07
See application file for complete search history.

(56) References Cited

U.S. PATENT DOCUMENTS

| 6,702,368 | B1* | 3/2004 | Hanyu | .................. | B62D 25/04 296/193.05 |
| 9,126,247 | B2* | 9/2015 | Kim | ......................... | B21B 1/12 |
| 9,533,713 | B2* | 1/2017 | Steffens | ................ | B21D 47/01 |
| 2007/0126264 | A1* | 6/2007 | Mizuma | ................ | B60N 2/015 296/204 |
| 2010/0072789 | A1* | 3/2010 | Boettcher | .......... | B62D 25/2018 296/209 |
| 2015/0001887 | A1* | 1/2015 | Saje | ..................... | B62D 25/025 296/193.08 |
| 2015/0042128 | A1* | 2/2015 | Kowaki | ............. | B62D 25/2027 296/193.07 |

(Continued)

FOREIGN PATENT DOCUMENTS

| JP | 2007-118736 A | 5/2007 |
| JP | 2008-230460 A | 10/2008 |

(Continued)

*Primary Examiner* — Jason S Morrow
(74) *Attorney, Agent, or Firm* — Morgan, Lewis & Bockius LLP (57) ABSTRACT

An underbody structure of a vehicle may include a side sill, a tunnel member, and a rear side member, all of which extend in a longitudinal direction of the vehicle, in which at least one of the side sill, the tunnel member, and the rear side member may include a plurality of first coupling sections, which is coupled to transverse members of the vehicle that extend in a transverse direction of the vehicle, and a plurality of first non-coupling sections, which is not coupled to the members arranged in the transverse direction of the vehicle, and the first coupling sections and the first non-coupling sections may have different thicknesses.

14 Claims, 7 Drawing Sheets (56) References Cited

U.S. PATENT DOCUMENTS

| | | | |
|---|---|---|---|
| 2016/0046328 A1* | 2/2016 | Steffens | B21D 47/01 |
| | | | 296/193.06 |
| 2016/0159406 A1* | 6/2016 | Qu | B62D 25/2036 |
| | | | 296/193.02 |
| 2017/0008573 A1* | 1/2017 | Otsuka | B62D 25/2036 |

FOREIGN PATENT DOCUMENTS

| | | |
|---|---|---|
| JP | 5493897 B2 | 5/2014 |
| JP | 2014-148211 A | 8/2014 |
| KR | 10-0288636 B1 | 8/2001 |

* cited by examiner

|   | 2 | 3 | 4 | 5 | 6 |
|---|---|---|---|---|---|
| A |   | 401 |   | 501 |   |
| B | 707 | 403 |   | 503 |   |
| C |   | 405 |   | 505 |   |
| D | 709 | 407 |   | 507 |   |
| E | 200 | | | | |
| D | 709 | 407 |   | 507 |   |
| C |   | 405 |   | 505 |   |
| B | 707 | 403 |   | 503 |   |
| A |   | 401 |   | 501 |   |

UNDERBODY STRUCTURE OF VEHICLE

CROSS-REFERENCE TO RELATED APPLICATION

The present application claims priority to Korean Patent Application No. 10-2015-0142588, filed Oct. 13, 2015, the entire contents of which is incorporated herein for all purposes by this reference.

BACKGROUND OF THE INVENTION

Field of the Invention

The present invention relates to an underbody structure of a vehicle, which absorbs shocks in the event of a collision and preserves space inside the vehicle, thereby ensuring the safety of passengers.

Description of Related Art

Design technology related to an underbody structure of a vehicle has been developed to allow the underbody structure to be configured so as to absorb a shock in the event of a vehicle collision and to prevent the shock from being transmitted to the passenger compartment, thereby increasing the safety of the passengers. That is, with regard to shocks transmitted in the event of a vehicle collision, part of the underbody structure of the vehicle is configured so as to deform in an accordion shape, thereby serving to absorb shocks that would otherwise be transmitted to the interior of the vehicle, part of the underbody structure undergoes bending to absorb the shock, and part of the underbody structure preserves space inside the vehicle, thereby serving to ensure the safety of passengers. However, the function of absorbing shocks and the function of preserving space inside the vehicle are contrary to each other, and therefore coexistence of the two functions is the core of the technology.

The above description is also applied to the case of a rear-end collision. In the case of a rear-end collision, in particular, since a fuel tank is mounted at the rear of the vehicle, the leakage of fuel caused by damage to the fuel tank may have serious consequences such as, for example, a fire. Therefore, the coexistence of the two functions of absorbing shocks and of preserving a safe space is very important.

That is, when the underbody structure of the vehicle is designed to have a high strength, the function of absorbing shocks is deteriorated. On the other hand, when the underbody structure of the vehicle is designed to have a low strength, the absorption of shocks is realized, but the function of preserving space inside the vehicle is difficult, which makes it impossible to ensure the safety of passengers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an underbody structure of a vehicle in which each constituent element is manufactured to have different thicknesses on a per section basis, so as to achieve strength distribution for the purpose of respective sections and to achieve reduced weight by omitting reinforcement elements.

According to various aspects of the present invention, an underbody structure of a vehicle may include a side sill, a tunnel member, and a rear side member, all of which extend in a longitudinal direction of the vehicle, in which at least one of the side sill, the tunnel member, and the rear side member may include a plurality of first coupling sections, which is coupled to transverse members of the vehicle that extend in a transverse direction of the vehicle, and a plurality of first non-coupling sections, which is not coupled to the members arranged in the transverse direction of the vehicle, and the first coupling sections and the first non-coupling sections may have different thicknesses.

The transverse members of the vehicle may include a seat-front cross member, a seat-rear cross member, and an intermediate cross member, in which at least one of the seat-front cross member, the seat-rear cross member, and the intermediate cross member may include a plurality of second coupling sections, which is coupled to the longitudinal members of the vehicle, and a plurality of second non-coupling sections, which is not coupled to the members arranged in the longitudinal direction of the vehicle, and the second coupling sections and the second non-coupling sections may have different thicknesses.

The transverse members of the vehicle may include a dash lower member, a seat-front cross member, and a seat-rear cross member, and the side sill may include a first side sill section configured as a front end portion and coupled to the dash lower member, a second side sill section extending rearward from the first side sill section, a third side sill section extending rearward from the second side sill section and coupled to the seat-front cross member, a fourth side sill section extending rearward from the third side sill section, a fifth side sill section extending rearward from the fourth side sill section and coupled to the seat-rear cross member, and a sixth side sill section extending rearward from the fifth side sill section, and the first, second, third, fourth, fifth and sixth side sill sections may have different thicknesses.

The second side sill section and the fourth side sill section may have a same thickness, a thickness of the first side sill section and the sixth side sill section may be smaller than the thickness of the second side sill section and the fourth side sill section, and a thickness of the third side sill section and the fifth side sill section may be greater than the thickness of the second side sill section and the fourth side sill section.

The transverse members of the vehicle may include a dash lower member, a seat-front cross member, a seat-rear cross member, and an intermediate cross member, in which the tunnel member may include a first tunnel member section configured as a front end portion of the tunnel member and coupled to the dash lower member, a second tunnel member section extending rearward from the first tunnel member section, a third tunnel member section extending rearward from the second tunnel member section and coupled to the seat-front cross member, a fourth tunnel member section extending rearward from the third tunnel member section, a fifth tunnel member section extending rearward from the fourth tunnel member section and coupled to the seat-rear cross member, a sixth tunnel member section extending rearward from the fifth tunnel member section, and a seventh tunnel member section extending rearward from the sixth tunnel member section and coupled to the intermediate cross member, and the first, second, third, fourth, fifth, sixth, and seventh tunnel member sections may have different thicknesses.

The second tunnel member section, the fourth tunnel member section, and the seventh tunnel member section may have a same thickness, a thickness of the first tunnel member section and the sixth tunnel member section may be smaller than the thickness of the second tunnel member section, the fourth tunnel member section, and the seventh tunnel member section, and a thickness of the third tunnel member section and the fifth tunnel member section may be greater than the thickness of the second tunnel member section, the fourth tunnel member section, and the seventh tunnel member section.

The transverse members of the vehicle may include an intermediate cross member, a first rear cross member, and a second rear cross member, in which the rear side member may include a seventh rear side member section configured as a front end portion of the rear side member and coupled to the intermediate cross member, an eighth rear side member section extending rearward from the seventh rear side member section, a ninth rear side member section extending rearward from the eighth rear side member section and coupled to the first rear cross member, a tenth rear side member section extending rearward from the ninth rear side member section, a eleventh rear side member section extending rearward from the tenth rear side member section and coupled to the second rear cross member, and a twelfth rear side member section extending rearward from the eleventh rear side member section, and the seventh, eighth, ninth, tenth, eleventh and twelfth rear side member sections may have different thicknesses.

The seventh rear side member section, the tenth rear side member section, and the eleventh rear side member section may have a same thickness, a thickness of the eighth rear side member section and the ninth rear side member section may be greater than the thickness of the seventh rear side member section, the tenth rear side member section, and the eleventh rear side member section, and a thickness of the twelfth rear side member section may be smaller than the thickness of the seventh rear side member section, the tenth rear side member section, and the eleventh rear side member section.

The longitudinal members of the vehicle may include a center side member and a tunnel side member, and the seat-front cross member may include an A-seat-front cross member section configured as an outer end of the vehicle body and coupled to the side sill a B-seat-front cross member section extending inward of the vehicle from the A-seat-front cross member section and coupled to the center side member, a C-seat-front cross member section extending inward of the vehicle from the B-seat-front cross member section, and a D-seat-front cross member section extending inward of the vehicle from the C-seat-front cross member section and coupled to the tunnel side member, and the A-seat-front cross member, B-seat-front cross member, C-seat-front cross member, and the D-seat-front cross member sections may have different thicknesses.

The B-seat-front cross member section and the D-seat-front cross member section may have a same thickness, a thickness of the A-seat-front cross member section may be greater than the thickness of the B-seat-front cross member section and the D-seat-front cross member section, and a thickness of the C-seat-front cross member section may be smaller than the thickness of the B-seat-front cross member section and D-seat-front cross member section.

The longitudinal members of the vehicle may include a center side member and a tunnel side member, and the seat-rear cross member may include an A-seat-rear cross member section configured as an outer end of the vehicle body and coupled to the side sill a B-seat-rear cross member section extending inward of the vehicle from the A-seat-rear cross member section and coupled to the center side member, a C-seat-rear cross member section extending inward of the vehicle from the B-seat-rear cross member section, and a D-seat-rear cross member section extending inward of the vehicle from the C-seat-rear cross member section and coupled to the tunnel side member, and the A-seat-rear cross member, B-seat-rear cross member, C-seat-rear cross member, and D-seat-rear cross member sections may have different thicknesses.

The B-seat-rear cross member section and the D-seat-rear cross member section may have a same thickness, a thickness of the A-seat-rear cross member section may be greater than the thickness of the B-seat-rear cross member section and the D-seat-rear cross member section, and a thickness of the C-seat-rear cross member section may be smaller than the thickness of the B-seat-rear cross member section and the D-seat-rear cross member section.

The longitudinal members of the vehicle may include a center side member and a tunnel side member, in which the intermediate cross member may include an A-intermediate cross member section configured as an outer end of the vehicle body and coupled to the side sill, a B-intermediate cross member section extending inward of the vehicle from the A-intermediate cross member section and coupled to the center side member, a C-intermediate cross member section extending inward of the vehicle from the B-intermediate cross member section, a D-intermediate cross member section extending inward of the vehicle from the C-intermediate cross member section and coupled to the tunnel side member, and an E-intermediate cross member section extending inward of the vehicle from the D-intermediate cross member section and coupled to the tunnel member, and the A-intermediate cross member, B-intermediate cross member, C-intermediate cross member, D-intermediate cross member, and E-intermediate cross member sections may have different thicknesses.

The B-intermediate cross member section and the D-intermediate cross member section of the intermediate cross member may have a same thickness, a thickness of the A-intermediate cross member section and the E-intermediate cross member section may be greater than the thickness of the B-intermediate cross member section and the D-intermediate cross member section, and a thickness of the C-intermediate cross member section may be smaller than the thickness of the B-intermediate cross member section and the D-intermediate cross member section.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
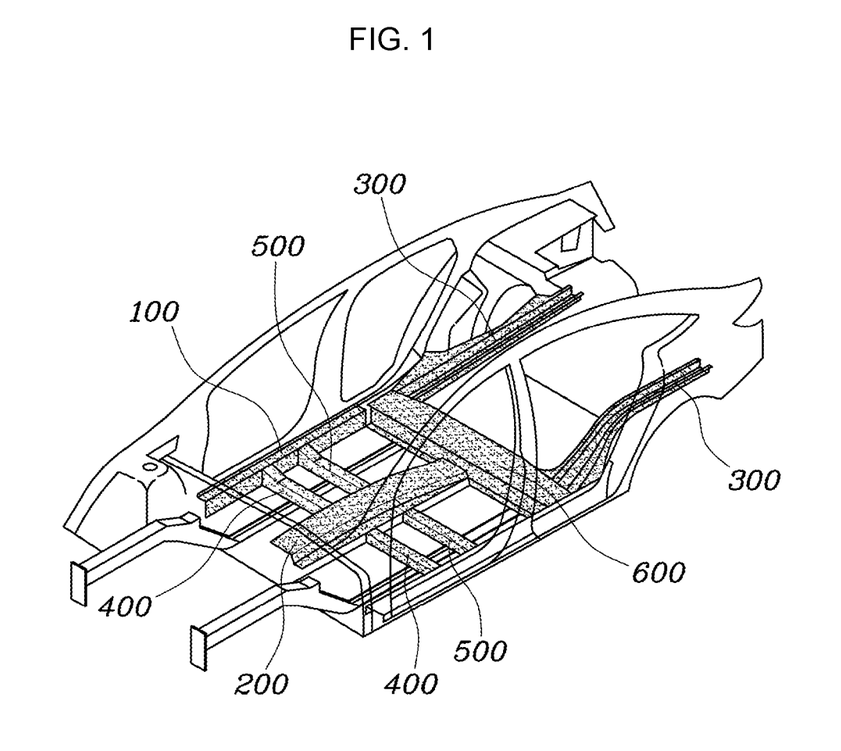
FIG. 1 is a view illustrating the configuration of an exemplary underbody structure of a vehicle according to the present invention.
Figure 2:
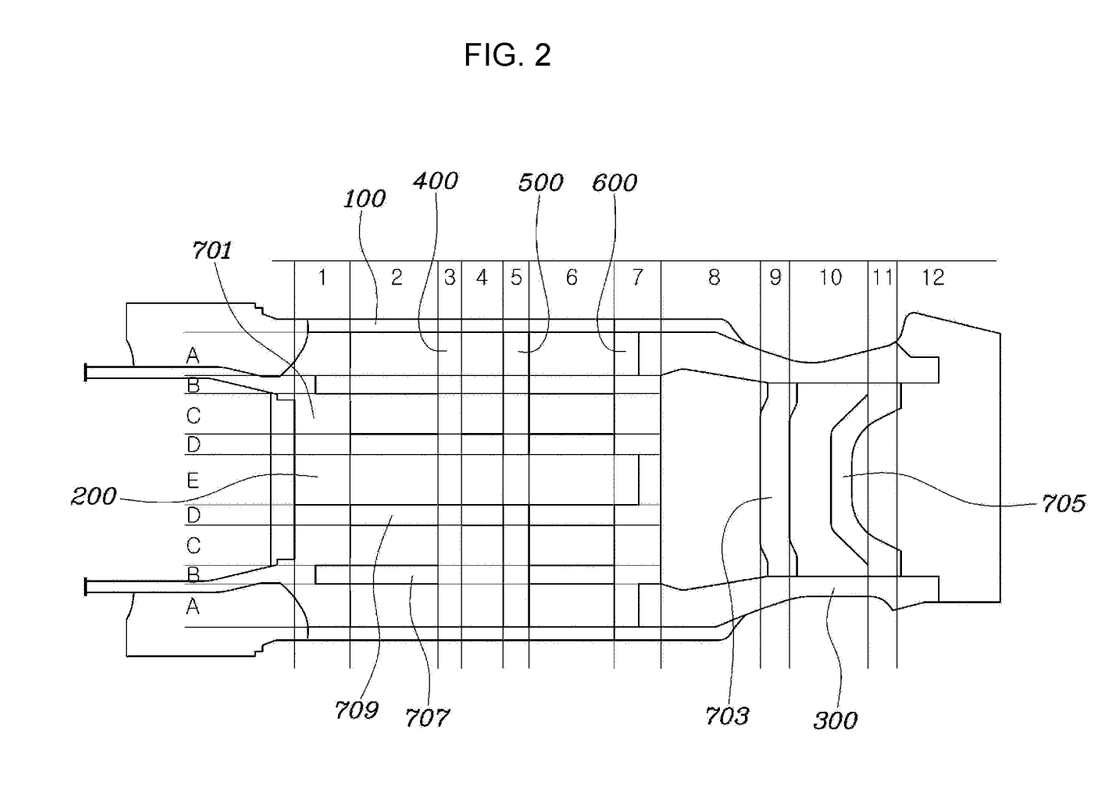
FIG. 2 is a view illustrating the arrangement of sections of the exemplary underbody structure of the vehicle according to the present invention.
Figure 3:
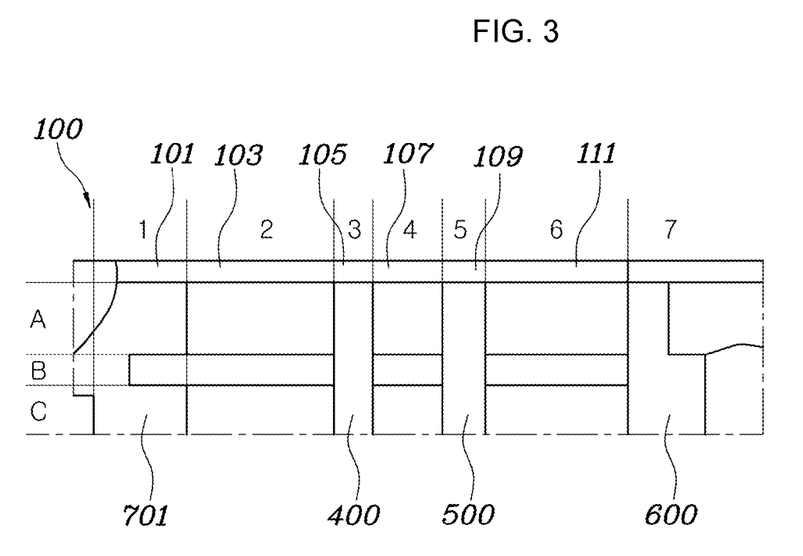
FIG. 3 is a view illustrating a side sill of the exemplary underbody structure of the vehicle according to the present invention.
Figure 4:
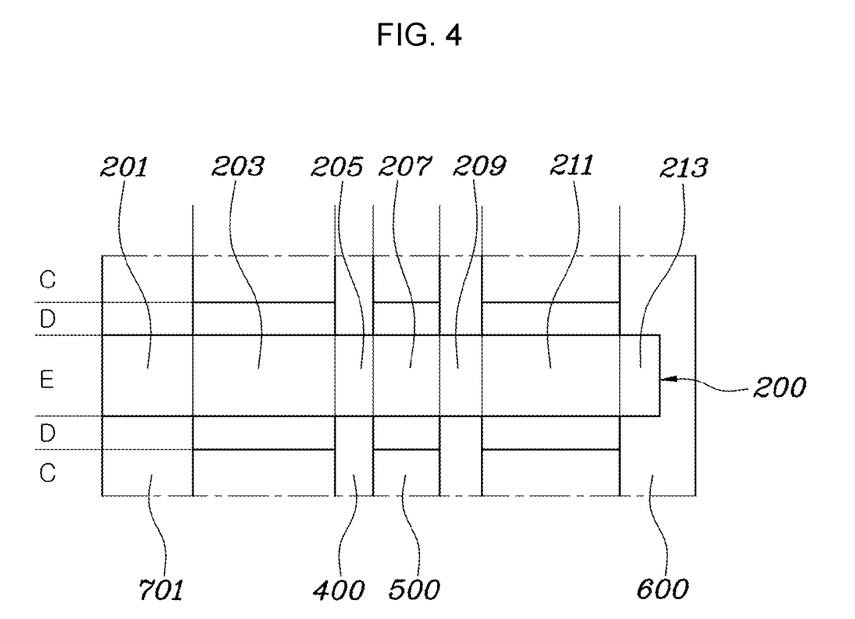
FIG. 4 is a view illustrating a tunnel member of the exemplary underbody structure of the vehicle according to the present invention.
Figure 5:
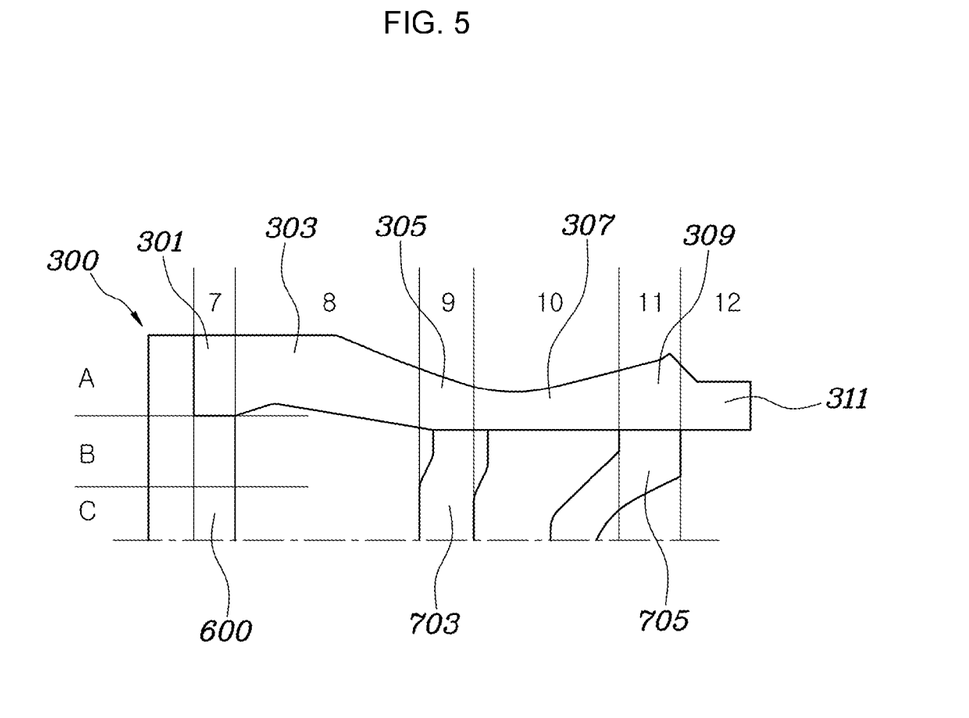
FIG. 5 is a view illustrating a rear side member of the exemplary underbody structure of the vehicle according to the present invention.
Figure 6:
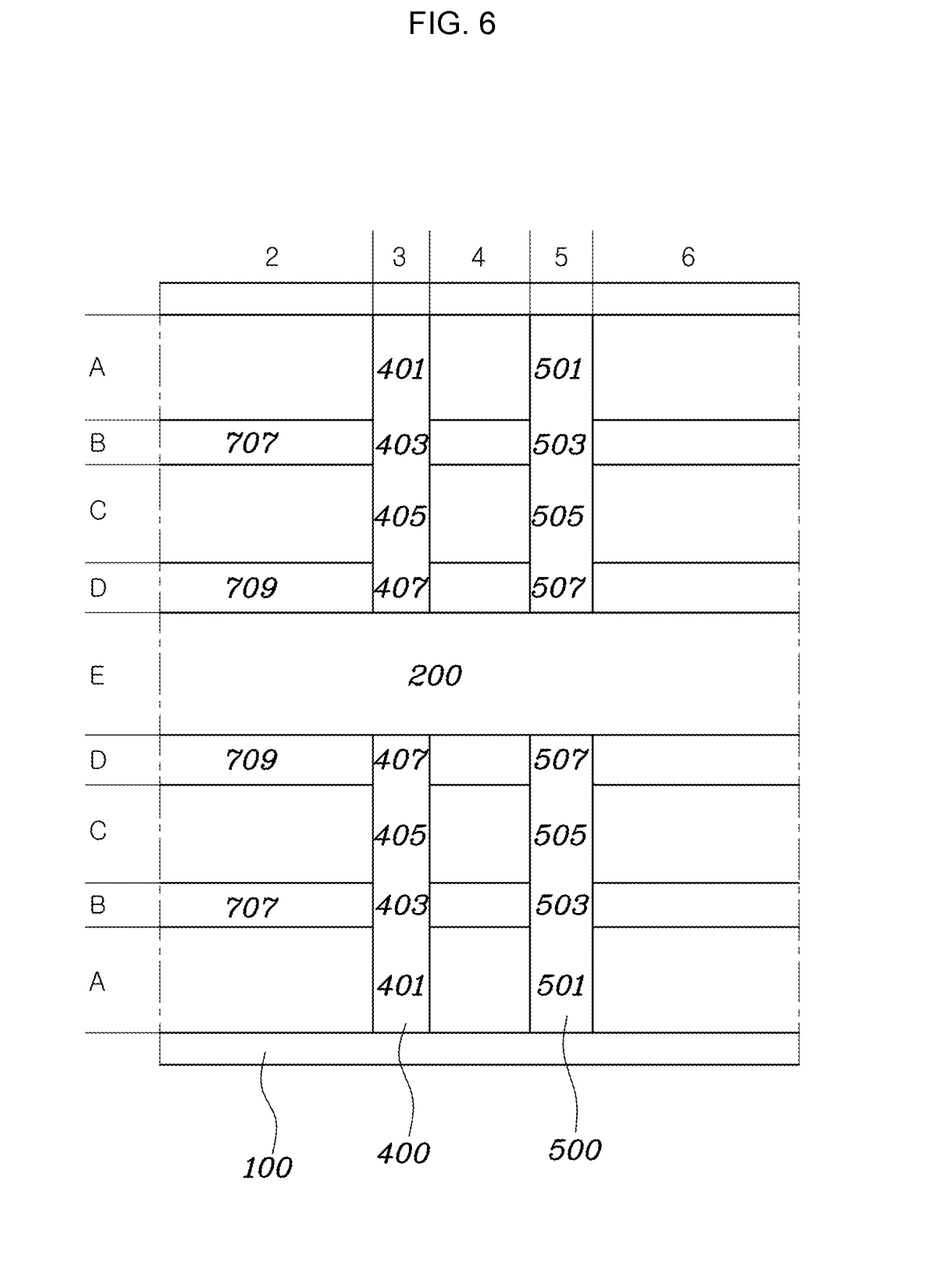
FIG. 6 is a view illustrating a seat-front cross member and a seat-rear cross member of the exemplary underbody structure of the vehicle according to the present invention.
Figure 7:
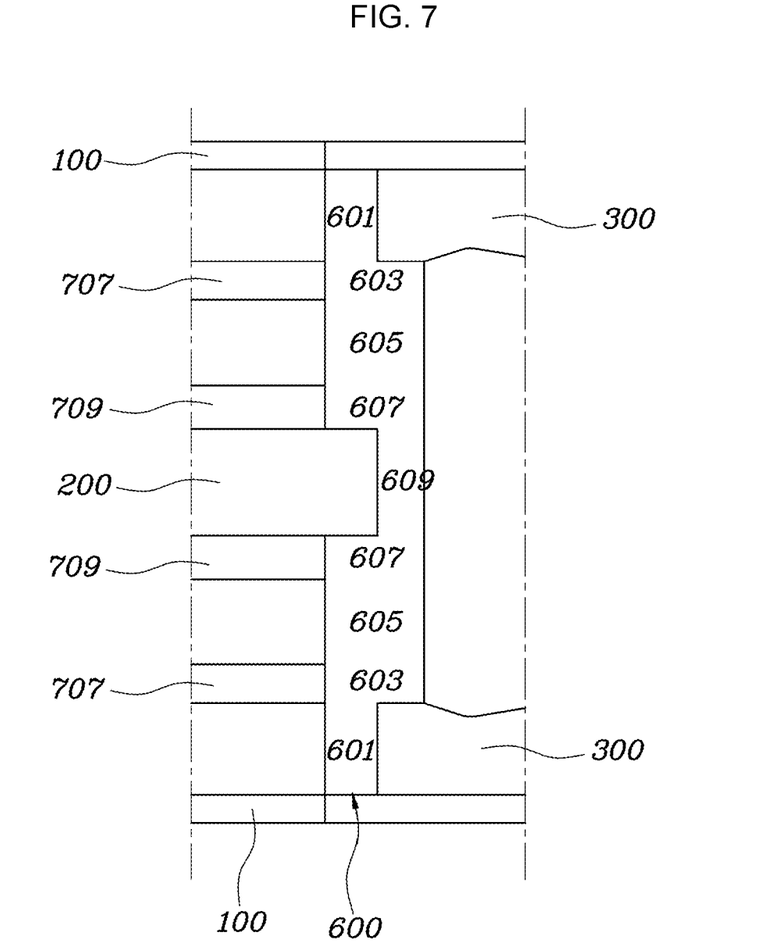
FIG. 7 is a view illustrating an intermediate cross member of the exemplary underbody structure of the vehicle according to the present invention.

FIG. 1 is a view illustrating the configuration of an underbody structure of a vehicle according to various embodiments of the present invention, FIG. 2 is a view illustrating the arrangement of sections of the underbody structure of the vehicle according to the various embodiment of the present invention, FIG. 3 is a view illustrating a side sill 100 of the underbody structure of the vehicle according to the various embodiments of the present invention, FIG. 4 is a view illustrating a tunnel member 200 of the underbody structure of the vehicle according to the various embodiments of the present invention, FIG. 5 is a view illustrating a rear side member 300 of the underbody structure of the vehicle according to the various embodiments of the present invention, FIG. 6 is a view illustrating a seat-front cross member 400 and a seat-rear cross member 500 of the underbody structure of the vehicle according to the various embodiments of the present invention, and FIG. 7 is a view illustrating an intermediate cross member 600 of the underbody structure of the vehicle according to the various embodiments of the present invention.

Referring to FIGS. 1 and 2, the underbody structure of the vehicle according to various embodiments of the present invention includes longitudinal members of the vehicle, which include side sills 100, a tunnel member 200, and rear-side members 300, all of which extend in the longitudinal direction of the vehicle. Any one or more of the side sills 100, the tunnel member 200, and the rear-side members 300 include a plurality of first coupling sections, which are coupled to transverse members of the vehicle that extend in the transverse direction of the vehicle, and a plurality of first non-coupling sections, which are not coupled to the members arranged in the transverse direction of the vehicle. The first coupling sections and the first non-coupling sections may have different thicknesses.

The first coupling sections correspond to reference numerals 101, 105, 109, 201, 205, 209, 213, 301, 305 and 309. The first non-coupling sections correspond to reference numerals 103, 107, 111, 203, 207, 211, 303, 307 and 311.

Referring to FIGS. 2 and 3, the transverse members of the vehicle include a dash lower member 701, a seat-front cross member 400, and a seat-rear cross member 500. The side sill 100 includes a first side sill section 101 which is a front end portion and is coupled to the dash lower member 701, a second side sill section 103 which extends rearward from the first side sill section 101, a third side sill section 105 which extends rearward from the second side sill section 103 and is coupled to the seat-front cross member 400, a fourth side sill section 107 which extends rearward from the third side sill section 105, a fifth side sill section 109 which extends rearward from the fourth side sill section 107 and is coupled to the seat-rear cross member 500, and a sixth side sill section 111 which extends rearward from the fifth side sill section 109. The first side sill section 101 to the sixth side sill section 111 may have different thicknesses.

Referring to FIG. 2, the transverse members of the vehicle include the seat-front cross member 400, the seat-rear cross member 500, and an intermediate cross member 600. Any one or more of the seat-front cross member 400, the seat-rear cross member 500, and the intermediate cross member 600 include a plurality of second coupling sections, which are coupled to longitudinal members of the vehicle, and a plurality of second non-coupling sections, which are not coupled to the members arranged in the longitudinal direction of the vehicle. The second coupling sections and the second non-coupling sections may have different thicknesses.

The second coupling sections correspond to reference numerals 401, 403, 407, 501, 503, 507, 601, 603, 607 and 609, and the second non-coupling sections include reference numerals 405, 505 and 605.

The underbody structure of the vehicle may be generally divided into longitudinal members and transverse members of the vehicle. Representative longitudinal members of the vehicle may include, for example, the side sills 100, the tunnel member 200, the rear-side members 300, tunnel side members 709, and a center side member. Representative transverse members of the vehicle may include, for example, the dash lower member 701, the seat-front cross member 400, the seat-rear cross member 500, the intermediate cross member 600, a first rear cross member 703, and a second rear cross member 705. The respective members of the vehicle are coupled to one another so as to construct the entire underbody structure of the vehicle.

The underbody structure of the vehicle serves not only as a frame to which major elements of the vehicle are mounted, but also to preserve the essentially required shape of the vehicle against collision shocks so as to protect the passengers inside the vehicle. Accordingly, the underbody structure fundamentally requires a rigid material and configuration in order to maintain the shape thereof.

However, in the case where members constituting a vehicle body are simply manufactured using only strong materials, or in the case where the number of members is increased in order to design an excessively strong configuration and thus ensure the rigidity of the vehicle body, the space in the passenger compartment may be preserved by preventing deformation of the vehicle body, but it is difficult to absorb and distribute energy generated in the event of a collision, thereby causing serious injuries to the passengers as the energy is transmitted to the passengers.

In addition, reinforcing the materials of the members constituting the vehicle body or increasing the number of members results in decreased fuel efficiency due to the increase in the weight of the vehicle body and increases the cost of producing the vehicle body. In some cases, despite the increase in weight and production cost, the members may not be substantially helpful to the protection of passengers in the event of a collision.

Therefore, it is necessary to optimize the configuration and design of the members so as to absorb and distribute energy generated in the event of a collision via deformation thereof while maintaining the rigidity of the vehicle body in the event of a collision.

The result of study and effort into optimizing the members is the processing of each constituent element of the vehicle body into multiple thicknesses. Since the vehicle body is constructed via the coupling of various longitudinal members and transverse members, coupling regions and non-coupling regions have different levels of contribution to the protection of passengers in the event of a collision. Accordingly, the respective constituent elements of the vehicle body are divided into sections having a high level of contribution and sections having a low level of contribution with regard to the protection of passengers in the event of a collision, thereby being processed into different thicknesses on a per section basis. That is, constituent elements having a high level of contribution to the protection of passengers in the event of a collision are increased in thickness, whereas constituent elements having a low level of contribution to the protection of passengers in the event of a collision are reduced in thickness, which may ensure the rigidity of the entire vehicle body, facilitate the absorption of collision energy via deformation, and improve the traveling performance and fuel efficiency of the vehicle owing to a reduction in the weight of the vehicle.

Referring to FIGS. 2 and 3, the transverse members of the vehicle include the dash lower member 701, the seat-front cross member 400, and the seat-rear cross member 500. The side sill 100 may include the first side sill section 101 which is a front end portion of the side sill 100 and is coupled to the dash lower member 701, the second side sill section 103 which extends rearward from the first side sill section 101, the third side sill section 105 which extends rearward from the second side sill section 103 and is coupled to the seat-front cross member 400, the fourth side sill section 107 which extends rearward from the third side sill section 105, the fifth side sill section 109 which extends rearward from the fourth side sill section 107 and is coupled to the seat-rear cross member 500, and the sixth side sill section 111 which extends rearward from the fifth side sill section 109. The first side sill section 101 to the sixth side sill section 111 may have different thicknesses.

The second side sill section 103 and the fourth side sill section 107 may have the same thickness, the thickness of the first side sill section 101 and the sixth side sill section 111 may be smaller than the thickness of the second side sill section 103 and the fourth side sill section 107, and the thickness of the third side sill section 105 and the fifth side sill section 109 may be greater than the thickness of the second side sill section 103 and the fourth side sill section 107.

The first side sill section 101 is a section which is a front end portion of the side sill 100 and is coupled to the dash lower member 701, the second side sill section 103 is a section which extends rearward from the first side sill section 101 and connects the first side sill section 101 to the third side sill section 105. The third side sill section 105 is a section which extends rearward from the second side sill section 103 and is coupled to the seat-front cross member 400. The fourth side sill section 107 is a section which extends rearward from the third side coal sill section 105 and connects the third side sill section 105 to the fifth side sill section 109. The fifth side sill section 109 is a section which extends rearward from the fourth side sill section 107 and is coupled to the seat-rear cross member 500. The sixth side sill section 111 is a section which extends rearward from the fifth side sill section 109.

At this time, the thicknesses of the respective sections are selected based on results acquired via various experimentations. Some sections, at which the longitudinal members and the transverse members of the vehicle are coupled to each other, are increased in rigidity for the effective distribution of energy transmitted in the event of a collision, and other sections are configured to maintain or reduce the rigidity thereof, thereby contributing to the safety of the passengers and a reduction in the weight of the vehicle.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

Referring to FIGS. 2 and 4, the transverse members of the vehicle include the dash lower member 701, the seat-front cross member 400, the seat-rear cross member 500, and the intermediate cross member 600. The tunnel member 200 includes a first tunnel member section 201 which is a front end portion of the tunnel member 200 and is coupled to the dash lower member 701, a second tunnel member section 203 which extends rearward from the first tunnel member section 201, a third tunnel member section 205 which extends rearward from the second tunnel member section 203 and is coupled to the seat-front cross member 400, a fourth tunnel member section 207 which extends rearward from the third tunnel member section 205, a fifth tunnel member section 209 which extends rearward from the fourth tunnel member section 207 and is coupled to the seat-rear cross member 500, a sixth tunnel member section 211 which extends rearward from the fifth tunnel member section 209, and a seventh tunnel member section 213 which extends rearward from the sixth tunnel member section 211 and is coupled to the intermediate cross member 600. The first tunnel member section 201 to the seventh tunnel member section 213 may have different thicknesses.

The second tunnel member section 203, the fourth tunnel member section 207, and the seventh tunnel member section 213 may have the same thickness, the thickness of the first tunnel member section 201 and the sixth tunnel member section 211 may be smaller than the thickness of the second tunnel member section 203, the fourth tunnel member section 207, and the seventh tunnel member section 213, and the thickness of the third tunnel member section 205 and the fifth tunnel member section 209 may be greater than the thickness of the second tunnel member section 203, the fourth tunnel member section 207, and the seventh tunnel member section 213.

The first tunnel member section 201 is a section which is a front end portion of the tunnel member 200 and is coupled to the dash lower member 701. The second tunnel member section 203 is a section which extends rearward from the first tunnel member section 201 and connects the first tunnel member section 201 to the third tunnel member section 205. The third tunnel member section 205 is a section which extends rearward from the second tunnel member section 203 and is coupled to the seat-front cross member 400. The fourth tunnel member section 207 is a section which extends rearward from the third tunnel member section 205 and connects the third tunnel member section 205 to the fifth tunnel member section 209. The fifth tunnel member section 209 is a section which extends rearward from the fourth tunnel member section 207 and is coupled to the seat-rear cross member 500. The sixth tunnel member section 211 is a section which extends rearward from the fifth tunnel member section 209 and connects the fifth tunnel member section 209 to the seventh tunnel member section 213. The seventh tunnel member section 213 is a section which extends rearward from the sixth tunnel member section 211 and is coupled to the intermediate cross member 600.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

Referring to FIGS. 2 and 5, the transverse members of the vehicle include the intermediate cross member 600, the first rear cross member 703, and the second rear cross member 705. The rear side member 300 includes a seventh rear side member section 301 which is a front end portion of the rear side member 300 and is coupled to the intermediate cross member 600, an eighth rear side member section 303 which extends rearward from the seventh rear side member section 301, a ninth rear side member section 305 which extends rearward from the eighth rear side member section 303 and is coupled to the first rear cross member 703, a tenth rear side member section 307 which extends rearward from the ninth rear side member section 305, a eleventh rear side member section 309 which extends rearward from the tenth rear side member section 307 and is coupled to the second rear cross member 705, and a twelfth rear side member section 311 which extends rearward from the eleventh rear side member section 309. The seventh rear side member section 301 to the twelfth rear side member section 311 may have different thicknesses.

The seventh rear side member section 301, the tenth rear side member section 307, and the eleventh rear side member section 309 may have the same thickness, the thickness of the eighth rear side member section 303 and the ninth rear side member section 305 may be greater than the thickness of the seventh rear side member section 301, the tenth rear side member section 307, and the eleventh rear side member section 309, and the thickness of the twelfth rear side member section 311 may be smaller than the thickness of the seventh rear side member section 301, the tenth rear side member section 307, and the eleventh rear side member section 309.

The seventh rear side member section 301 is a section which is a front end portion of the rear side member 300 and is coupled to the intermediate cross member 600, the eighth rear side member section 303 is a section which extends rearward from the seventh rear side member section 301 and connects the seventh rear side member section 301 to the ninth rear side member section 305. The ninth rear side member section 305 is a section which extends rearward from the eighth rear side member section 303 and is coupled to the first rear cross member 703. The tenth rear side member section 307 is a section which extends rearward from the ninth rear side member section 305 and connects the ninth rear side member section 305 to the eleventh rear side member section 309. The eleventh rear side member section 309 is a section which extends rearward from the tenth rear side member section 307 and is coupled to the second rear cross member 705. The twelfth rear side member section 311 is a section which extends rearward from the eleventh rear side member section 309.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

Referring to FIGS. 2 and 6, the longitudinal members of the vehicle include center side members 707 and the tunnel side members 709.

The seat-front cross member 400 includes an A-seat-front cross member section 401 which is an outer end of the vehicle body and is coupled to the side sill 100, a B-seat-front cross member section 403 which extends inward of the vehicle from the A-seat-front cross member section 401 and is coupled to the center side member 707, a C-seat-front cross member section 405 which extends inward of the vehicle from the B-seat-front cross member section 403, and a D-seat-front cross member section 407 which extends inward of the vehicle from the C-seat-front cross member section 405 and is coupled to the tunnel side member 709. The A-seat-front cross member section 401 to the D-seat-front cross member section 407 may have different thicknesses.

The B-seat-front cross member section 403 and the D-seat-front cross member section 407 may have the same thickness, the thickness of the A-seat-front cross member section 401 may be greater than the thickness of the B-seat-front cross member section 403 and the D-seat-front cross member section 407, and the thickness of the C-seat-front cross member section 405 may be smaller than the thickness of the B-seat-front cross member section 403 and the D-seat-front cross member section 407.

The A-seat-front cross member section 401 is a section which is an outer end of the vehicle body and is coupled to the side sill 100. The B-seat front cross member section 403 is a section which extends inward of the vehicle from the A-seat-front cross member section 401 and is coupled to the center side member 707. The C-seat-front cross member section 405 is a section which extends inward of the vehicle from the B-seat-front cross member section 403 and connects the B-seat-front cross member section 403 to the D-seat-front cross member section 407. The D-seat-front cross member section 407 is a section which extends inward of the vehicle from the C-seat-front cross member 405 and is coupled to the tunnel side member 709.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

Referring to FIGS. 2 and 6, the longitudinal members of the vehicle include the center side members 707 and the tunnel side members 709. The seat-rear cross member 500 includes an A-seat-rear cross member section 501 which is an outer end of the vehicle body and is coupled to the side sill 100, a B-seat-rear cross member section 503 which extends inward of the vehicle from the A-seat-rear cross member section 501 and is coupled to the center side member 707, a C-seat-rear cross member section 505 which extends inward of the vehicle from the B-seat-rear cross member section 503, and a D-seat-rear cross member section 507 which extends inward of the vehicle from the C-seat-rear cross member section 505 and is coupled to the tunnel side member 709. The A-seat-rear cross member section 501 to the D-seat-rear cross member section 507 may have different thicknesses.

The B-seat-rear cross member section 503 and the D-seat-rear cross member section 507 may have the same thickness, the thickness of the A-seat-rear cross member section 501 may be greater than the thickness of the B-seat-rear cross member section 503 and the D-seat-rear cross member section 507, and the thickness of the C-seat-rear cross member section 505 may be smaller than the thickness of the B-seat-rear cross member section 503 and the D-seat-rear cross member section 507.

The A-seat-rear cross member section 501 is a section which is an outer end of the vehicle body and is coupled to the side sill 100. The B-seat-rear cross member section 503 is a section which extends inward of the vehicle from the A-seat-rear cross member section 501 and is coupled to the center side member 707. The C-seat-rear cross member section 505 is a section which extends inward of the vehicle from the B-seat-rear cross member section 503 and connects the B-seat-rear cross member section 503 to the D-seat-rear cross member section 507. The D-seat-rear cross member section 507 is a section which extends inward of the vehicle from the C-seat-rear cross member 505 and is coupled to the tunnel side member 709.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

Referring to FIGS. 2 and 7, the longitudinal members of the vehicle include the center side members 707 and the tunnel side members 709. The intermediate cross member 600 includes an A-intermediate cross member section 601 which is an outer end of the vehicle body and is coupled to the side sill 100, an B-intermediate cross member section 603 which extends inward of the vehicle from the A-intermediate cross member section 601 and is coupled to the center side member 707, a C-intermediate cross member section 605 which extends inward of the vehicle from the B-intermediate cross member section 603, a D-intermediate cross member section 607 which extends inward of the vehicle from the C-intermediate cross member section 605 and is coupled to the tunnel side member 709, and an E-intermediate cross member section 609 which extends inward of the vehicle from the D-intermediate cross member section 607 and is coupled to the tunnel member 200. The A-intermediate cross member section 601 to the E-intermediate cross member section 609 may have different thicknesses.

The B-intermediate cross member section 603 and the D-intermediate cross member section 607 of the intermediate cross member 600 may have the same thickness, the thickness of the A-intermediate cross member section 601 and the E-intermediate cross member section 609 may be greater than the thickness of the B-intermediate cross member section 603 and the D-intermediate cross member section 607, and the thickness of the C-intermediate cross member section 605 may be smaller than the thickness of the B-intermediate cross member section 603 and the D-intermediate cross member section 607.

The A-intermediate cross member section 601 is a section which is an outer end of the vehicle body and is coupled to the side sill 100. The B-intermediate cross member section 603 is a section which extends inward of the vehicle from the A-intermediate cross member section 601 and is coupled to the center side member 707. The C-intermediate cross member section 605 is a section which extends inward of the vehicle from the B-intermediate cross member section 603 and connects the B-intermediate cross member section 603 to the D-intermediate cross member section 607. The D-intermediate cross member section 607 is a section which extends inward of the vehicle from the C-intermediate cross member 605 and is coupled to the tunnel side member 709. The E-intermediate cross member section 609 is a section which extends inward of the vehicle from the D-intermediate cross member section 607 and is coupled to the tunnel member 200.

The actual thicknesses of the respective sections are determined by measuring the rigidity of the respective sections of each member while changing the thicknesses of the respective sections and separating the sections that vary greatly in rigidity from the sections that vary only slightly in rigidity in consideration of the increase in thickness.

The methods whereby the underbody structure protects passengers from shocks may be divided into three kinds. The first method is to absorb shock energy as a constituent member of the underbody undergoes compressive deformation in the event of a collision. The second method is to absorb shock energy via deformation and bending of a rigid body when compressive deformation of the member is difficult due to the rigid body around the member. The third method is to protect passengers by preserving the passenger compartment or the space in which important components are accommodated. In this way, it is necessary to diversify the thicknesses and rigidities of respective sections of a single element according to whether the section needs to absorb shock energy via deformation thereof or whether the section needs to preserve an absolute space volume. In the case of the conventional method, in which reinforcing members are added to regions of respective elements for which the strength needs to be increased, the addition of the reinforcement members may disadvantageously increase assembly costs, and the improvement in strength is inadequate because the reinforcing members are attached to the main members via welding.

TABLE 1

| Part Name | Conventional Configuration | | Configuration of Invention | | Remarks |
|---|---|---|---|---|---|
| | Thickness (mm) | Weight (kg) | Thickness (mm) | Weight (kg) | |
| Side sill | 1.2 | 6.5 | 0.8~1.1 | 5.2 | TRB applied |
| Tunnel member | 0.8 | 2.8 | 0.8~1.2 | 3.4 | |
| Rear side member | 1.6 | 10.2 | 1.0~1.6 | 8.7 | |

TABLE 1-continued

| Part Name | Conventional Configuration | | Configuration of Invention | | Remarks |
| --- | --- | --- | --- | --- | --- |
| | Thickness (mm) | Weight (kg) | Thickness (mm) | Weight (kg) | |
| Seat-front cross member | 1.2 | 2.8 | 0.8~1.2 | 2.2 | |
| Seat-rear cross member | 1.2 | 2.3 | 0.8~1.2 | 1.7 | TWB applied |
| Intermediate member | 0.8 | 3.2 | 1.0~1.2 | 4.4 | |
| Total | | 27.8 | | 25.6 | |

As can be appreciated from the above table, as each of the longitudinal members and transverse members of the vehicle constructing the underbody structure is molded such that the member is divided into several sections based on a positional relationship between the members, and as the respective sections of the member have different thicknesses determined via experimentation for determining the level of contribution of the respective sections in protecting against a collision, the present invention may achieve various effects of ensuring the rigidity of the vehicle body, reducing the weight of the vehicle body, and improving the safety of passengers.

As is apparent from the above description related to an underbody structure of a vehicle according to the present invention, as each constituent element of the underbody structure is manufactured to have different thicknesses on a per section basis so as to achieve strength distribution for the purpose of respective sections, reinforcement elements may be omitted, or each constituent element may have an increased or reduced thickness compared to a conventional element having a single thickness, which has the effect of reducing the weight of the underbody structure of the vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An underbody structure of a vehicle, comprising:
a side sill, a tunnel member, and a rear side member, all of which extend in a longitudinal direction of the vehicle,
wherein at least one of the side sill, the tunnel member, and the rear side member includes a plurality of first coupling sections, which is coupled to transverse members of the vehicle that extend in a transverse direction of the vehicle, and a plurality of first non-coupling sections, which is not coupled to the members arranged in the transverse direction of the vehicle, and
wherein the first coupling sections and the first non-coupling sections have a predetermined thicknesses identical with each other in one sections of the first coupling sections and the first non-coupling sections and the predetermined thicknesses in the one sections of the first coupling sections and the first non-coupling sections are different from a predetermined thicknesses in another sections of the first coupling sections and the first non-coupling sections, respectively.

2. The underbody structure according to claim 1, wherein the transverse members of the vehicle include a seat-front cross member, a seat-rear cross member, and an intermediate cross member,
wherein at least one of the seat-front cross member, the seat-rear cross member, and the intermediate cross member includes a plurality of second coupling sections, which is coupled to the longitudinal members of the vehicle, and a plurality of second non-coupling sections, which is not coupled to the members arranged in the longitudinal direction of the vehicle, and
wherein the second coupling sections and the second non-coupling sections have a predetermined thicknesses identical with each other in one sections of the second coupling sections and the second non-coupling sections and the thicknesses in the one sections of the second coupling sections and the second non-coupling sections are different from a predetermined thicknesses in another sections of the second coupling sections and the second non-coupling sections, respectively.

3. The underbody structure according to claim 1, wherein the transverse members of the vehicle include a dash lower member, a seat-front cross member, and a seat-rear cross member, and
wherein the side sill includes:
a first side sill section configured as a front end portion and coupled to the dash lower member;
a second side sill section extending rearward from the first side sill section;
a third side sill section extending rearward from the second side sill section and coupled to the seat-front cross member;
a fourth side sill section extending rearward from the third side sill section;
a fifth side sill section extending rearward from the fourth side sill section and coupled to the seat-rear cross member; and
a sixth side sill section extending rearward from the fifth side sill section.

4. The underbody structure according to claim 3, wherein the second side sill section and the fourth side sill section have a same thickness, a thickness of the first side sill section and the sixth side sill section is smaller than the thickness of the second side sill section and the fourth side sill section, and a thickness of the third side sill section and the fifth side sill section is greater than the thickness of the second side sill section and the fourth side sill section.

5. The underbody structure according to claim 1, wherein the transverse members of the vehicle include a dash lower member, a seat-front cross member, a seat-rear cross member, and an intermediate cross member,
wherein the tunnel member includes:
a first tunnel member section configured as a front end portion of the tunnel member and coupled to the dash lower member;

a second tunnel member section extending rearward from the first tunnel member section;
a third tunnel member section extending rearward from the second tunnel member section and coupled to the seat-front cross member;
a fourth tunnel member section extending rearward from the third tunnel member section;
a fifth tunnel member section extending rearward from the fourth tunnel member section and coupled to the seat-rear cross member;
a sixth tunnel member section extending rearward from the fifth tunnel member section; and
a seventh tunnel member section extending rearward from the sixth tunnel member section and coupled to the intermediate cross member.

6. The underbody structure according to claim 5, wherein the second tunnel member section, the fourth tunnel member section, and the seventh tunnel member section have a same thickness, a thickness of the first tunnel member section and the sixth tunnel member section is smaller than the thickness of the second tunnel member section, the fourth tunnel member section, and the seventh tunnel member section, and a thickness of the third tunnel member section and the fifth tunnel member section is greater than the thickness of the second tunnel member section, the fourth tunnel member section, and the seventh tunnel member section.

7. The underbody structure according to claim 1, wherein the transverse members of the vehicle include an intermediate cross member, a first rear cross member, and a second rear cross member,
wherein the rear side member includes:
a seventh rear side member section configured as a front end portion of the rear side member and coupled to the intermediate cross member;
an eighth rear side member section extending rearward from the seventh rear side member section;
a ninth rear side member section extending rearward from the eighth rear side member section and coupled to the first rear cross member;
a tenth rear side member section extending rearward from the ninth rear side member section;
an eleventh rear side member section extending rearward from the tenth rear side member section and coupled to the second rear cross member; and
a twelfth rear side member section extending rearward from the eleventh rear side member section.

8. The underbody structure according to claim 7, wherein the seventh rear side member section, the tenth rear side member section, and the eleventh rear side member section have a same thickness, a thickness of the eighth rear side member section and the ninth rear side member section is greater than the thickness of the seventh rear side member section, the tenth rear side member section, and the eleventh rear side member section, and a thickness of the twelfth rear side member section is smaller than the thickness of the seventh rear side member section, the tenth rear side member section, and the eleventh rear side member section.

9. The underbody structure according to claim 2, wherein the longitudinal members of the vehicle include a center side member and a tunnel side member, and
wherein the seat-front cross member includes:
an A-seat-front cross member section configured as an outer end of the vehicle body and coupled to the side sill;
a B-seat-front cross member section extending inward of the vehicle from the A-seat-front cross member section and coupled to the center side member;
a C-seat-front cross member section extending inward of the vehicle from the B-seat-front cross member section; and
a D-seat-front cross member section extending inward of the vehicle from the C-seat-front cross member section and coupled to the tunnel side member.

10. The underbody structure according to claim 9, wherein the B-seat-front cross member section and the D-seat-front cross member section have a same thickness, a thickness of the A-seat-front cross member section is greater than the thickness of the B-seat-front cross member section and the D-seat-front cross member section, and a thickness of the C-seat-front cross member section is smaller than the thickness of the B-seat-front cross member section and the D-seat-front cross member section.

11. The underbody structure according to claim 2, wherein the longitudinal members of the vehicle include a center side member and a tunnel side member, and
wherein the seat-rear cross member includes:
an A-seat-rear cross member section configured as an outer end of the vehicle body and coupled to the side sill;
a B-seat-rear cross member section extending inward of the vehicle from the A-seat-rear cross member section and coupled to the center side member;
a C-seat-rear cross member section extending inward of the vehicle from the B-seat-rear cross member section; and
a D-seat-rear cross member section extending inward of the vehicle from the C-seat-rear cross member section and coupled to the tunnel side member.

12. The underbody structure according to claim 11, wherein the B-seat-rear cross member section and the D-seat-rear cross member section have a same thickness, a thickness of the A-seat-rear cross member section is greater than the thickness of the B-seat-rear cross member section and the D-seat-rear cross member section, and a thickness of the C-seat-rear cross member section is smaller than the thickness of the B-seat-rear cross member section and the D-seat-rear cross member section.

13. The underbody structure according to claim 2, wherein the longitudinal members of the vehicle include a center side member and a tunnel side member,
wherein the intermediate cross member includes:
an A-intermediate cross member section configured as an outer end of the vehicle body and coupled to the side sill;
a B-intermediate cross member section extending inward of the vehicle from the A-intermediate cross member section and coupled to the center side member;
a C-intermediate cross member section extending inward of the vehicle from the B-intermediate cross member section;
a D-intermediate cross member section extending inward of the vehicle from the C-intermediate cross member section and coupled to the tunnel side member; and
an E-intermediate cross member section extending inward of the vehicle from the D-intermediate cross member section and coupled to the tunnel member.

14. The underbody structure according to claim 13, wherein the B-intermediate cross member section and the D-intermediate cross member section of the intermediate cross member have a same thickness, a thickness of the A-intermediate cross member section and the E-intermediate cross member section is greater than the thickness of the B-intermediate cross member section and the D-intermediate cross member section, and a thickness of the C-intermediate cross member section is smaller than the thickness of the B-intermediate cross member section and the D-intermediate cross member section.

* * * * *